United States Patent
Merdler et al.

(10) Patent No.: US 10,938,715 B2
(45) Date of Patent: Mar. 2, 2021

(54) THROUGHPUT IN A CROSSBAR NETWORK ELEMENT BY MODIFYING MAPPINGS BETWEEN TIME SLOTS AND PORTS

(71) Applicant: MELLANOX TECHNOLOGIES TLV LTD., Ra'anana (IL)

(72) Inventors: Ofir Merdler, Tel Aviv (IL); George Elias, Tel Aviv (IL); Yuval Shpigelman, Netanya (IL); Eyal Srebro, Yokneam Moshava (IL); Sagi Kuks, Ramat Gan (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 104 days.

(21) Appl. No.: 16/436,945

(22) Filed: Jun. 11, 2019

(65) Prior Publication Data

US 2020/0396158 A1 Dec. 17, 2020

(51) Int. Cl.
*H04L 12/773* (2013.01)
*H04L 12/935* (2013.01)
*H04L 12/933* (2013.01)
*H04L 12/861* (2013.01)

(52) U.S. Cl.
CPC .......... *H04L 45/60* (2013.01); *H04L 49/101* (2013.01); *H04L 49/3018* (2013.01); *H04L 49/3027* (2013.01); *H04L 49/9005* (2013.01)

(58) Field of Classification Search
CPC . H04L 45/60; H04L 49/3027; H04L 49/3018; H04L 49/101; H04L 49/9005
See application file for complete search history.

(56) References Cited

U.S. PATENT DOCUMENTS

| | | | |
|---|---|---|---|
| 6,629,147 B1 * | 9/2003 | Grow | H04L 12/5601 709/236 |
| 6,813,274 B1 | 11/2004 | Suzuki et al. | |
| 7,016,365 B1 * | 3/2006 | Grow | H04L 49/106 370/392 |
| 7,079,525 B1 * | 7/2006 | Goldstein | H04L 49/101 370/352 |
| 7,193,994 B1 | 3/2007 | Payson | |
| 7,768,519 B1 * | 8/2010 | Anderson | G06F 15/8053 345/505 |

(Continued)

FOREIGN PATENT DOCUMENTS

CA 2347924 A1 * 11/2001 ........... H04L 49/254

*Primary Examiner* — Omar J Ghowrwal
(74) *Attorney, Agent, or Firm* — Kligler & Associates Patent Attorneys Ltd (57) ABSTRACT

A network element includes output ports, a crossbar fabric and a scheduler. The output ports are organized in groups of multiple output ports selectable over predefined time slots in accordance with a cyclic mapping assigned to each group. In each time slot, the crossbar fabric routes to fabric outputs data received from the buffers via fabric inputs, in accordance with a routing plan. The scheduler determines and applies the routing plan for transmitting packets from the buffers to the communication network via the crossbar fabric and output ports. When in a given time slot, a required readout rate from a given buffer exceeds a maximum rate, the scheduler selects a group of the output ports to which the given buffer is routed in that time slot, and modifies the cyclic mapping for that group to reduce the required readout rate from the given buffer in the given time slot.

20 Claims, 3 Drawing Sheets

(56) References Cited

U.S. PATENT DOCUMENTS

| | | |
|---|---|---|
| 10,608,939 B1* | 3/2020 | Kim ................... H04L 43/062 |
| 2002/0024953 A1* | 2/2002 | Davis ................ H04L 49/1576 |
| | | 370/395.1 |
| 2002/0064154 A1 | 5/2002 | Sharma et al. |
| 2004/0083326 A1 | 4/2004 | Wang et al. |
| 2004/0085979 A1 | 5/2004 | Lee et al. |
| 2005/0089054 A1 | 4/2005 | Ciancaglini et al. |
| 2007/0280261 A1 | 12/2007 | Szymanski |
| 2008/0031262 A1* | 2/2008 | Nishizaki .............. H04L 49/505 |
| | | 370/395.71 |
| 2018/0076934 A1* | 3/2018 | Huitema ............... H04L 1/1671 |
| 2020/0127946 A1* | 4/2020 | Levi ..................... H04L 49/90 |

\* cited by examiner

THROUGHPUT IN A CROSSBAR NETWORK ELEMENT BY MODIFYING MAPPINGS BETWEEN TIME SLOTS AND PORTS

TECHNICAL FIELD

Embodiments described herein relate generally to communication systems, and particularly to methods and systems for dynamic management of resources in a network element for improving throughput.

BACKGROUND

A crossbar fabric is a switching element that simultaneously transfers data between multiple pairs of fabric inputs and corresponding fabric outputs. Using a crossbar fabric as a routing element in network elements is known in the art. For example, U.S. Patent Application Publication 2007/0280261 describes a method for scheduling cell transmissions through a switch with rate and delay guarantees and with low jitter. The method applies to a classic input-buffered N-by-N crossbar switch without speedup. The time axis is divided into frames, each containing F time-slots. An N-by-N traffic rate matrix specifies a quantized guaranteed traffic rate from each input port to each output port. The traffic rate matrix is transformed into a permutation with NF elements which is decomposed into F permutations of N elements using a recursive and fair decomposition method. Each permutation is used to configure the crossbar switch for one time-slot within a frame of size F time-slots, and all F permutations result in a Frame Schedule.

U.S. Pat. No. 6,813,274 describes a network switch and a method for data switching using a crossbar switch fabric with output port groups operating concurrently and independently. The network switch includes a crossbar switch fabric, a plurality of output port groups, and a plurality of input ports. The crossbar switch fabric includes a plurality of inputs and outputs. The plurality of output port groups operate concurrently and independently, and each output port group includes one or more output ports and is configured to receive a packet from one of the outputs of the crossbar switch and to send the packet to an output port. The plurality of input ports are coupled to an input of the crossbar switch fabric and configured to send packets to the crossbar switch fabric through the input of the crossbar switch fabric. Each input port includes a plurality of input buffer groups, and each input buffer group is assigned to send a packet for one of the output port groups such that there is a one-to-one correspondence between each of the input buffer groups and output port groups.

SUMMARY

An embodiment that is described herein provides a network element, including multiple output ports, a crossbar fabric and a scheduler. The multiple output ports are coupled to a communication network and are organized in M groups, each group including P output ports that are selectable over respective predefined time slots in accordance with a cyclic mapping between the time slots and the output ports for that group. The crossbar fabric including M fabric outputs coupled respectively to the groups, and N fabric inputs coupled respectively to N buffers that store packets for transmission via the output ports. In each time slot, the crossbar fabric is configured to receive data from the buffers via the fabric inputs, and route the data to the fabric outputs in accordance with a routing plan. The scheduler is configured to determine the routing plan over the time slots, and to apply the routing plan for transmitting the packets from the buffers to the communication network via the crossbar fabric and the output ports. In response to identifying that, in a given time slot, a required rate of readout of the packets from a given buffer exceeds a maximum rate supported by the given buffer, the scheduler is configured to select a group of the output ports to which the given buffer is routed by the crossbar fabric in the given time slot, and to modify the cyclic mapping for the selected group to produce a modified cyclic mapping that reduces the required rate of readout from the given buffer in the given time slot.

In some embodiments, the given buffer includes a number F of interfaces for simultaneously reading data of F different packets that are pending for transmission in the given buffer, and the scheduler is configured to identify that the given buffer is oversubscribed by identifying that a number of simultaneous transmissions requested from the given buffer exceeds the number F. In other embodiments, the scheduler is configured to identify that the given buffer is oversubscribed by monitoring readout status of at least some of the N buffers, including the given buffer, and the readout status of a buffer is indicative of a number of transmission requests assigned to that buffer. In yet other embodiments, the scheduler is configured to identify that the given buffer is oversubscribed, by monitoring multiple transmission queues associated respectively with the multiple output ports, including a transmission queue of an output port to which the given buffer is routed, and checking whether a buffer routed to an output port of a monitored queue is oversubscribed.

In an embodiment, the scheduler is configured to produce the modified cyclic mapping by applying a permutation among the time slots and the output ports of the cyclic mapping so that no other buffer that is routed to an output port of the selected group becomes oversubscribed by using the modified cyclic mapping. In another embodiment, the scheduler is configured to determine a permutation to be applied to the cyclic mapping for producing the modified cyclic mapping, and to apply the determined permutation to the cyclic mapping only after a delay that does not exceed a maximal predefined delay. In yet another embodiment, the scheduler is configured to modify the cyclic mapping by swapping a time slot assigned in the cyclic mapping to an output port to which the given buffer is routed, with a different time slot assigned in the cyclic mapping to another output port in the selected group.

In some embodiments, the different time slot is assigned for transmission by another buffer, and the scheduler is configured to verify that a required rate of readout from the another buffer is less than a maximum rate supported by the another buffer. In other embodiments, the scheduler is configured to apply the routing plan by coordinating, for each time slot, between (i) reading from a buffer using a specified read interface, (ii) applying a specified routing scheme within the crossbar fabric, and (iii) outputting the read data to a specified output port. In yet other embodiments, in response to identifying that a transmission queue associated with a given output port is congested, the scheduler is configured to give the group of output ports to which the given output port belongs, high priority to be selected for cyclic mapping modification.

There is additionally provided, in accordance with an embodiment that is described herein, a method, including, in a network element including multiple output ports coupled to a communication network and organized in M groups, each group including P output ports that are selectable over respective predefined time slots in accordance with a cyclic mapping between the time slots and the output ports for that group, and a crossbar fabric including M fabric outputs coupled respectively to the groups, and N fabric inputs coupled respectively to N buffers that store packets for transmission via the output ports, receiving in each time slot, by the crossbar fabric, data from the buffers via the fabric inputs, and routing the data to the fabric outputs in accordance with a routing plan. The routing plan over the time slots is determined, and the routing plan is applied for transmitting the packets from the buffers to the communication network via the crossbar fabric and the output ports. In response to identifying that, in a given time slot, a required rate of readout of the packets from a given buffer exceeds a maximum rate supported by the given buffer, a group of the output ports to which the given buffer is routed by the crossbar fabric in the given time slot is selected, and the cyclic mapping for the selected group is modified to produce a modified cyclic mapping that reduces the required rate of readout from the given buffer in the given time slot.

These and other embodiments will be more fully understood from the following detailed description of the embodiments thereof, taken together with the drawings in which:

DETAILED DESCRIPTION OF EMBODIMENTS

Overview

Embodiments that are described herein provide methods and systems for improving throughput in a network element comprising a crossbar fabric.

A network element comprises multiple ports communicating packets with network nodes or other network elements in a communication network. A network element receiving a packet from the communication network should transmit the packet via an output port that has a path to the packet's destination. In the disclosed embodiments, routing of packets to the correct output ports is carried out using a crossbar fabric.

Large bandwidth applications require network elements having a large number of input ports and output ports, which is typically translated to a crossbar fabric having a large number of fabric inputs and outputs. In the disclosed embodiments, the time axis is divided into time-division cycles, each comprising a predefined number of time slots. By using such a time division scheme, a given fabric input can serve more than a single input port, and a given fabric output can serve more than a single output port. Therefore, a relatively small-sized cross fabric can be used.

As will be described in detail below, in the disclosed embodiments the network element stores packets pending for transmission in buffers that each supports multiple simultaneous read operations toward the crossbar fabric. A buffer is referred to herein as "oversubscribed" when it is required to simultaneously transmit, in a given time slot, to a number of output ports larger than the maximal number of simultaneous read operation supported by that buffer. In principle, this configuration is designed to improve utilization of the output ports. Throughput, however, may be degraded when one or more buffers become oversubscribed and therefore fail to fulfill all their transmission requests.

Consider an embodiment of a network element comprising multiple output ports coupled to a communication network and organized in M groups, each group comprising P output ports that are selectable over respective predefined time slots in accordance with a cyclic mapping between the time slots and the output ports for that group. The cyclic mapping defines a cyclic order in which the P output ports of a group are scanned over P time slots. The sequence of time slots makes a basic time-division cycle of P time slots that repeats over time. In the cyclic mapping of a given group, each time slot of the time-division cycle is associated with a respective output port of the given group.

The network element further comprises a crossbar fabric comprising M fabric outputs coupled respectively to the groups, and N fabric inputs coupled respectively to N buffers that store packets for transmission via the output ports, wherein in each time slot, the crossbar fabric is configured to receive data from the buffers via the fabric inputs, and route the data to the fabric outputs in accordance with a routing plan.

The network element also comprises a scheduler that schedules packet transmissions. The scheduler determines the routing plan over the time slots and applies the routing plan for transmitting the packets from the buffers to the communication network via the crossbar fabric and the output ports. In response to identifying that in a given time slot, a required rate of readout of the packets from a given buffer exceeds a maximum rate supported by the given buffer, the scheduler selects a group of the output ports to which the given buffer is routed by the crossbar fabric in the given time slot, and modifies the cyclic mapping for the selected group to a modified cyclic mapping that reduces the required rate of readout from the given buffer in the given time slot.

In some embodiments, the given buffer comprises a number F of interfaces for simultaneously reading data of F different packets that are pending for transmission in the given buffer. The scheduler identifies that the given buffer is oversubscribed by identifying that a number of simultaneous transmissions requested from the given buffer exceeds the number F.

In some embodiments, the scheduler scans the buffers in searching for oversubscribed buffers. The scheduler monitors readout status of at least some of the N buffers, wherein the readout status of a buffer is indicative of a number of transmission requests assigned to that buffer. In other embodiments, the scheduler scans transmission queues associated respectively with the multiple output ports and checks whether a buffer routed to an output port of a monitored queue is oversubscribed.

The scheduler may modify a cyclic mapping in various ways. In an embodiment, the scheduler produces the modified cyclic mapping by applying a permutation among the time slots and the output ports of the cyclic mapping so that no other buffer that is routed to an output port of the selected group becomes oversubscribed by using the modified cyclic mapping. In some embodiments, the scheduler limits the rate of applying cyclic modifications to avoid unnecessary modifications and for improving scheduling stability. In some embodiments, the scheduler determines a permutation to be applied to the cyclic mapping, but actually applies this permutation to the cyclic mapping only after a delay that does not exceed a maximal predefined delay.

In some embodiments, the scheduler modifies the cyclic mapping by swapping a time slot assigned in the cyclic mapping to an output port to which the given buffer is routed, with a different time slot assigned in the cyclic mapping to another output port in the selected group. The different time slot is assigned for transmission by another buffer, wherein a required rate of readout from the other buffer is less than a maximum rate supported by the other buffer.

In some embodiments, the network element monitors transmission queues associated with the output ports. In these embodiments, in response to identifying that a transmission queue associated with a given output port is congested, the scheduler is configured to give the group of output ports to which the given output port belongs, high priority in selection for cyclic mapping modification.

In the disclosed techniques a crossbar-based network element operates in a time division mode so that output ports in a group of output ports are assigned different time slots. In addition, buffers that store packets pending transmission support multiple simultaneous read operations. In each time slot, a scheduler synchronizes the operations of buffer reading, routing via the crossbar fabric and sending the read data to the correct port. The scheduler monitors buffers and transmission queues activity and dynamically modifies cyclic mappings between time slots and output ports to resolve oversubscribed buffers and to improve throughput. The disclosed embodiments are useful in particular for traffic that varies slowly.

System Description

Figure 1:
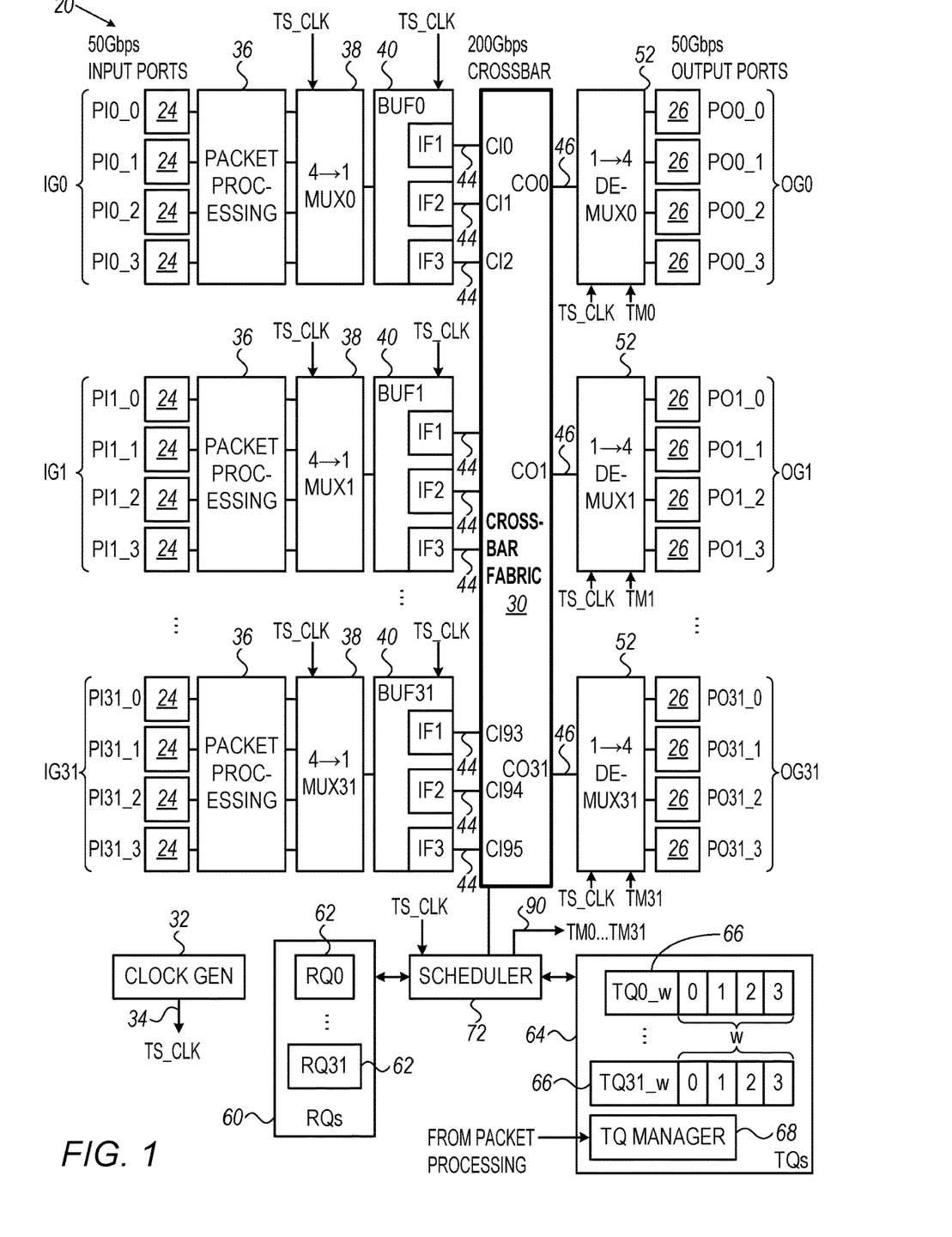
FIG. 1 is a block diagram that schematically illustrates a network element that dynamically modifies cyclic mappings between time slots and output ports for improving throughput, in accordance with an embodiment that is described herein.

FIG. 1 is a block diagram that schematically illustrates a network element 20 that dynamically modifies cyclic mappings between time slots and output ports for improving throughput, in accordance with an embodiment that is described herein.

Network element 20 typically serves as a building block in a communication network that provides communication among network nodes such as computing nodes or servers. Network element 20 comprises input ports 24 for receiving packets from the communication network and output ports 26 for transmitting packets to the communication network. Each of input ports 24 and output ports 26 typically connects to a port of another network element or to a port of a network node in the communication network, using a suitable network link (not shown). In some embodiments, input ports 24 and output ports 26 are arranged in pairs, and the input port and output port in each pair are connected to a common network link.

Network element 20 can be used in a communication network of any suitable type, using any suitable communication protocols such as, for example, an Ethernet network, an InfiniBand™ network or an Internet Packet (IP) network such as the Internet. Moreover, network element 20 may comprise any suitable network element that routes packets such as a switch or a router.

Network element 20 comprises a crossbar fabric 30, which is also referred to herein simply as a "crossbar" for brevity. The crossbar fabric routes packets that were received via the input ports and buffered, to their destination output ports as will be described in detail below. Network element 20, and in particular crossbar fabric 30, operate in discrete time units that are referred to as "time slots." In the present example, the time slots are organized in time-division cycles of four time slots per time-division cycle.

The network element comprises a clock generator 32 that generates a clock signal 34 denoted TS_CLK. The duration of a single time slot is defined as a single period of the TS_CLK signal. The time slot duration depends on the underlying data rate required and on the number of bits delivered via the crossbar fabric within a single time slot. In an example embodiment, the crossbar fabric transfers data at a rate of 200 Gigabits per second, by transferring 48 Bytes (384 bits) in each time slot. In this embodiment, the time slot duration is 384 bits/200 Gbps=1.92 nanoseconds.

In the example of FIG. 1, data flows among various elements of the network element in units of 48 Bytes or 348 bits. This is not mandatory, and in alternative embodiments data units having other suitable sizes can also be used.

In the example of FIG. 1, network element 20 comprises 128 input ports (24), and 128 output ports (26). Each of the input ports supports receiving packets from the communication network at a rate of 50 Gigabits per second, and each of the output ports supports transmitting packets to the communication network at a rate of 50 Gigabits per second.

In network element 20, the input ports and the output ports are partitioned into groups of four ports corresponding to the four time slots of the time-division cycle. The 128 input ports are thus partitioned into 32 input groups denoted IG0 . . . IG31, wherein each of the input groups comprises four input ports. Similarly, the 128 output ports are partitioned into 32 output groups denoted OG0 . . . OG31, wherein each of the output groups comprises four output ports. In alternative embodiments, the network element may comprise any suitable numbers of input ports and output ports other than 128. Further alternatively, any time-division cycle having a number of time slots other than four can also be used.

For each of the 32 input groups, network element 20 comprises a processing chain that comprises a packet processing module 36, a four-to-one multiplexer 38 and a buffer 40. Packet processing module 36 processes packets received via the four input ports of the relevant input group. In some embodiments, the packet processing module forwards 48 Bytes over each input of four-to-one multiplexer 38 per time slot, and the four-to-one multiplexer delivers the 4·48 Bytes at its four inputs for storage in buffer 40, per each time slot. Buffer 40 thus fills at a data rate that is four times higher than the data rate at the input ports.

Packet processing module 36 applies to the received packets various processing such as verifying the correctness of the data in the packet payload, packet classification and prioritization, and routing. To this end, the packet processing module typically checks certain fields in the packets headers such as source and destination addresses, port numbers, and the underlying network protocol used. In the present example, packet processing module 36 processes in series packets received via four respective input ports 24.

Buffer 40 stores processed packets for the entire input group, i.e., packets that were received via any of the input ports of the relevant input group. Buffer 40 comprises multiple read interfaces for reading from the buffer stored packets for transmission. In the present example, buffer 40 comprises three interfaces, denoted IF1, IF2 and IF3. The buffer therefor supports up to three simultaneous read operations, for reading out of the buffer information of up to three different packets simultaneously. In some embodiments, reading from buffer 40 via interfaces IF1, IF2 and IF3 is implemented using a reading state machine (not shown).

At each time slot, each of the three interfaces may provide to the crossbar fabric 48 Bytes of a selected packet that is stored in the buffer. In the present example, each of the read interfaces supports reading packets at a maximal rate of 200 Gigabits per second, and therefore buffer 40 supports a maximal readout rate of 600 Gigabits per second.

Crossbar fabric 30 comprises multiple fabric inputs 44 (input lines) via which the crossbar receives data from buffers 40, and multiple fabric outputs 46 (output lines) via which the crossbar transmits data toward the output ports. In the present example, the fabric inputs and fabric outputs have a bus width of 48 Bytes.

In the example of FIG. 1, the crossbar fabric comprises 96 fabric inputs denoted CI0 . . . CI95—three fabric inputs coupled to each of buffers 40, and 32 fabric outputs denoted CO0 . . . CO31—one fabric output per each of the output groups of the output ports. In each time slot, the crossbar fabric receives data over the fabric inputs, and forwards that data to the fabric outputs in accordance with a routing plan that interconnects between up to 32 pairs of fabric inputs and fabric outputs, concurrently.

Each fabric output 46 is coupled to a respective output group via a one-to-four de-multiplexer 52. At each time slot, the one-to-four de-multiplexer connects the respective fabric output to one of the output ports of the relevant output group. One-to-four de-multiplexer 52 connects the fabric output to the four ports sequentially, over four consecutive time slots of the time-division cycle.

One-to-four de-multiplexer 52 scans the output ports of the respective output group in a cyclic order that is specified in a respective cyclic mapping 90 between the time slots and output ports. Let [T0, T1, T2, T3] denote a time-division cycle of four consecutive time slots. The cyclic mapping for the $j^{th}$ output group OGj is denoted TMj (j=0 . . . 31) and may specify a default mapping that associates between time slots [T0, T1, T2, T3] and output ports [POj_0, POj_1, POj_2, POj_3], respectively. As will be described in detail bellow, modifying the cyclic mapping between output ports and time slots in a given output group may resolve situations in which a buffer is oversubscribed for reading.

The network element of FIG. 1 manages packet storage and transmission using queues. The network element comprises an RQ module 60 comprising 32 Receive Queues (RQs) 62, denoted RQ0 . . . RQ31, for managing packet transmission from respective buffers (40) BUF0 . . . BUF31. The RQs hold, for example, status information of buffer usage, as will described below. The network element further comprises a TQ module 64 comprising 128 Transmit Queues (TQs) 66, one TQ for each output port 26 (i.e., four TQs per output group) for handling the transmission of packets via the output ports. The TQs of output group OGj (j=0 . . . 31) are denoted TQj_w, w=0 . . . 3.

The TQ module further comprises a TQ manager that manages TQs 66. For example, based on information provided by packet processing modules 36, the TQ manager fills the TQs with TQ elements comprising, e.g., pointers to buffers and to packets stored in these buffers. The TQ elements in a given TQ specify the packets and the transmission order of these packets via the relevant output port. In some embodiments, nonempty TQs generate transmission requests to relevant RQs for requesting packet transmission.

Network element 20 comprises a scheduler 72 that communicates with RQs 62 and TQs 66. Based on information provided by the RQs and TQs, the scheduler schedules synchronized transmission of packets from buffers 40 to output ports 26 via crossbar fabric 30. In some embodiments, scheduler 72 determines a routing plan for the network element over the time slots. The routing plan specifies for each time slot T0 . . . T3 of the time-division cycle (i) which of buffers 40 are read and via which of the three read interfaces, (ii) the interconnection between fabric inputs and fabric outputs within crossbar fabric 30, and (iii) the cyclic mapping in each of the output groups, i.e., which output port is connected via the one-to-four de-multiplexer to the fabric output in each time slot.

Consider, for example, a packet in BUF0 transmitted to port PO1_1 of output group OG1. The scheduler may specify a routing plan that assigns time slot T1 to PO1_1, for example. The scheduler additionally specifies for T1, in the routing plan, reading 48 Bytes of the packet from BUF0 via IF1 to fabric input CI0, and interconnecting within the crossbar fabric between fabric input CI0 and fabric output CO1.

Scheduler 72 serves as a resource allocator of the network element. The scheduler matches between buffers 40 in which packets are pending for transmission, and output ports to which the packets are destined. In terms of queue management, RQ resources refer to the read interfaces of buffers 40, and TQ resources refer to time slots for transmission via the output ports. The main functions carried out by the scheduler are now described.

In some embodiments, the scheduler monitors transmission requests originating by the TQs. In some embodiments, the transmission requests are handled in pipeline structures (not shown). The scheduler determines time slots availability and read interfaces availability for transmitting buffered packets. The scheduler is continuously aware of whether the read interfaces of the buffers are busy or free.

An important function of the scheduler is to arbitrate between TQ resources and RQ resources, in order to resolve possible conflicts. For example, multiple TQs may request transmissions from a common buffer. A conflict arises when the number of TQs requesting transmissions form a common buffer exceeds the number of read interfaces of this buffer. In an arbitration cycle, TQ requests that can be fulfilled are matched to available RQ resources, whereas other TQ requests are delayed. The matched resources of time slots and buffer read interfaces comprise at least part of a routing plan.

In applying a routing plan, for each time slot the scheduler coordinates between reading from a buffer using a specified read interface, applying the correct routing within the crossbar fabric and outputting the read data to the correct output port. In coordinating between the read operation from a buffer and routing the read data via the crossbar, the buffer read interface and the crossbar are treated as a semi-strict pipeline architecture. Among other features, this approach assists in varying pipeline length so that commands sent to the buffers and commands sent to the crossbar fabric arrive at the same time.

In some embodiments, in applying the routing plan in a given time slot, the scheduler issues a suitable assignment or command to the RQ of the relevant buffer specifying the interface to be used for reading, to the crossbar fabric specifying the routing scheme, and to a TQ of the relevant output port specifying the cyclic mapping to be used. The scheduler issues the assignments simultaneously so that the reading operation from the buffer, routing within the crossbar fabric, and controlling the relevant de-multiplexer 52 occur in synchronization to the relevant time slot.

The configuration of network element 20, crossbar fabric 30 and scheduler 72 shown in FIG. 1 are example configurations, which are chosen purely for the sake of conceptual clarity. In alternative embodiments, any other suitable network element, crossbar fabric and scheduler configurations can be used. Elements that are not necessary for understanding the principles of the disclosed embodiments, such as various interfaces, addressing circuits, timing and sequencing circuits and debugging circuits, have been omitted from the figure for clarity.

Some elements of network element 20, such as packet processing module 36, crossbar fabric 30 and scheduler 72, may be implemented in hardware, e.g., in one or more Application-Specific Integrated Circuits (ASICs) or Field-Programmable Gate Arrays (FPGAs). Additionally or alternatively, some elements of network element 20, for example scheduler 72, can be implemented using software, or using a combination of hardware and software elements. Buffers 40 may be implemented using any suitable memory, such as Random Access Memory (RAM).

In some embodiments, some of the functions of the network element, e.g., scheduler 72, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
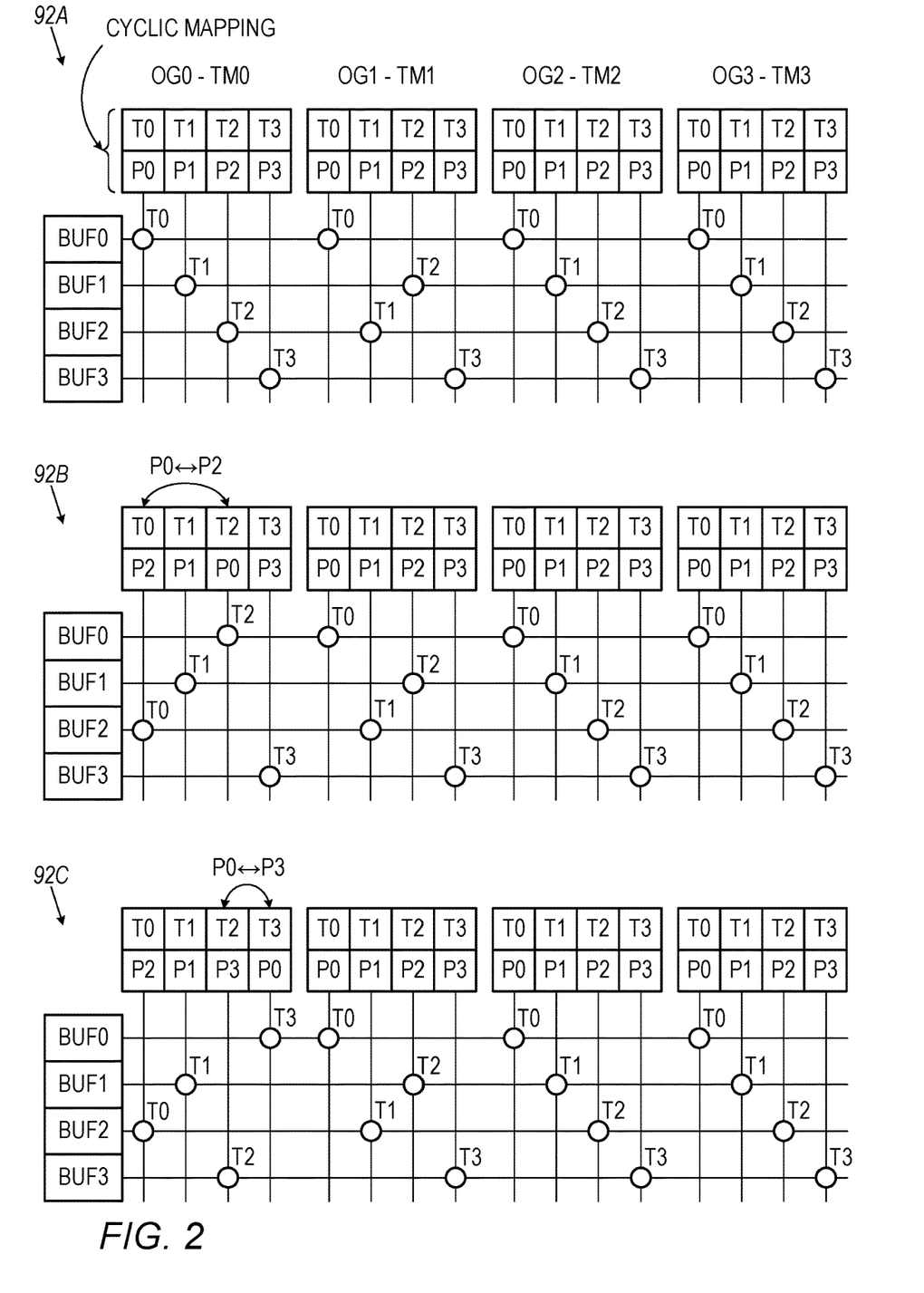
FIG. 2 is a diagram that schematically illustrates a process of modifying a cyclic mapping between time slots and output ports for reducing readout rate in a given buffer at a given time slot, in accordance with an embodiment that is described herein.

Modifying Cyclic Mappings Between Time Slots and Output Ports to Improve Throughput FIG. 2 is a diagram that schematically illustrates a process of modifying a cyclic mapping between time slots and output ports for reducing readout rate in a given buffer at a given time slot, in accordance with an embodiment that is described herein.

FIG. 2 depicts an initial suboptimal routing plan 92A, and two evolved versions of the initial routing plan, denoted 92B and 92C, that achieve an improved throughput. The routing plans in FIG. 2 depict connections between buffers 40 and output ports 26 across time slots of the time-division cycle. For the sake of clarity, details of reading from the buffers and routing via the crossbar fabric are omitted.

In the example of FIG. 2, each of routing plans 92A . . . 92C schedules transmissions from four buffers BUF0 . . . BUF3 to output ports that belong to four output groups OG0 . . . OG3. The output ports in each of the output groups are denoted P0, P1, P2 and P3. The output groups OG0 . . . OG3 are associated with respective cyclic mappings TM0 . . . TM3 (90) that each maps between time slots T0 . . . T3 and ports P0 . . . P3 of the relevant output group. In routing plan 92A, all of the output groups share a default cyclic mapping that assigns time slots T0, T1, T2, T3 to the respective output ports P0, P1, P2, P3. In this case, the four cyclic mappings TM0 . . . TM3 are all equal to the default mapping.

In FIG. 2, a grid of horizontal and vertical lines comprises a framework for presenting connections between buffers and output ports. The horizontal lines are associated with buffers, and the vertical lines are associated with output ports. A circled dot placed over a grid junction, represents an actual interconnection (via crossbar fabric 30 and one-to-four de-multiplexer 52) between a buffer and an output port in a given time slot in accordance with the relevant cyclic mapping. Note that only one dot is placed on a vertical line, because a given output port can serve only one buffer in a given time slot.

In the present example, in routing plan 92A, in each of output groups OG0, OG2 and OG3, the buffers [BUF0, BUF1, BUF2, BUF3] transmit to respective output ports [P0, P1, P2, P3] in respective time slots [T0, T1, T2, T3]. In OG1, [BUF0, BUF1, BUF2, BUF3] transmit to [P0, P2, P1, P3] in respective time slots [T0, T2, T1, T3].

In accordance with routing plan 92A, BUF0 is required to transmit to four different output groups in a common time slot T0. Since a buffer 40 has only three read interfaces, the required readout rate from BUF0 exceeds its maximal supported readout rate. A similar situation applies also to BUF3, which is required to transmit to four different output groups in time slot T3.

Routing plan 92B attempts to resolve the problem in BUF0 by reducing the number of concurrent transmissions from BUF0 in time slot T0. To this end, scheduler 72 modifies the cyclic mapping TM0 of output group OG0 so that the assignments T0-P0 and T2-P2 in routing plan 92A, are modified in routing plan 92B to T0-P2 and T2-P0, respectively. Accordingly, BUF0 now transmits to P0 in time slot T2, whereas BUF2 transmits to P2 in time slot T0. After modifying cyclic mapping TM0 in OG0 as described above, BUF0 transmits to only three output groups in T0, which meets its readout capabilities. In routing plan 92B, however, BUF3 is still required to transmit to four output groups in time slot T3. This situation is resolved in routing plan 92C.

In routing plan 92C, the scheduler modifies cyclic mapping TM0 of routing plan 92B so that the assignments T2-P0 and T3-P3 of routing plan 92B are modified in routing plan 92C to T2-P3 and T3-P0, respectively. Consequently, BUF0 now transmits to P0 in time slot T3, and BUF3 transmits to P3 in time slot T2. Routing plan 92C thus resolves underutilization of both BUF0 and BUF3 that occurs in using routing plan 92A.

As will be described below, in some embodiments, scheduler 72 monitors TQs and RQs, which enables the scheduler to identify buffers 40 that are requested by more than three TQs in a common time slot, and in response, to modify the cyclic mapping in one or more output groups. In the example above, the scheduler modifies the cyclic mapping TM0 in two steps, and in each step swaps the time slot assignments of two output ports. This scheme resolves oversubscription of one buffer at a step.

The modification applied by the scheduler to cyclic mappings may not be unique. In some embodiments, one of multiple possible modifications to cyclic mappings in one or more output groups can be applied. For example, the scheduler may modify a cyclic mapping for resolving oversubscription of more than one buffer in a single modification step. For example, the scheduler may modify TM0 of routing plan 92A directly to TM0 of routing plan 92C. In another embodiment, to resolve the oversubscription of BUF0 and BUF3 in routing plan 92A, the scheduler swaps between P0 and P3 in one or more of the cyclic mappings of output groups OG0 . . . OG3.

In some embodiments, the scheduler avoids modifying a cyclic mapping when the modified cyclic mapping causes another buffer to become oversubscribed. As an example that is not necessarily related to the oversubscription of BUF0 and BUF3, modifying cyclic mapping TM1 in routing plan 92A by swapping between the assignments T1-P1 and T2-P2 so that BUF1 transmits to P2 at T1 and BUF2 transmits to P1 at T2 would result in both BUF1 and BUF2 having four transmission requests in a common time slot.

Such a modification may result in reduced throughput and is avoided by scheduler 72, in an embodiment.

Figure 3:
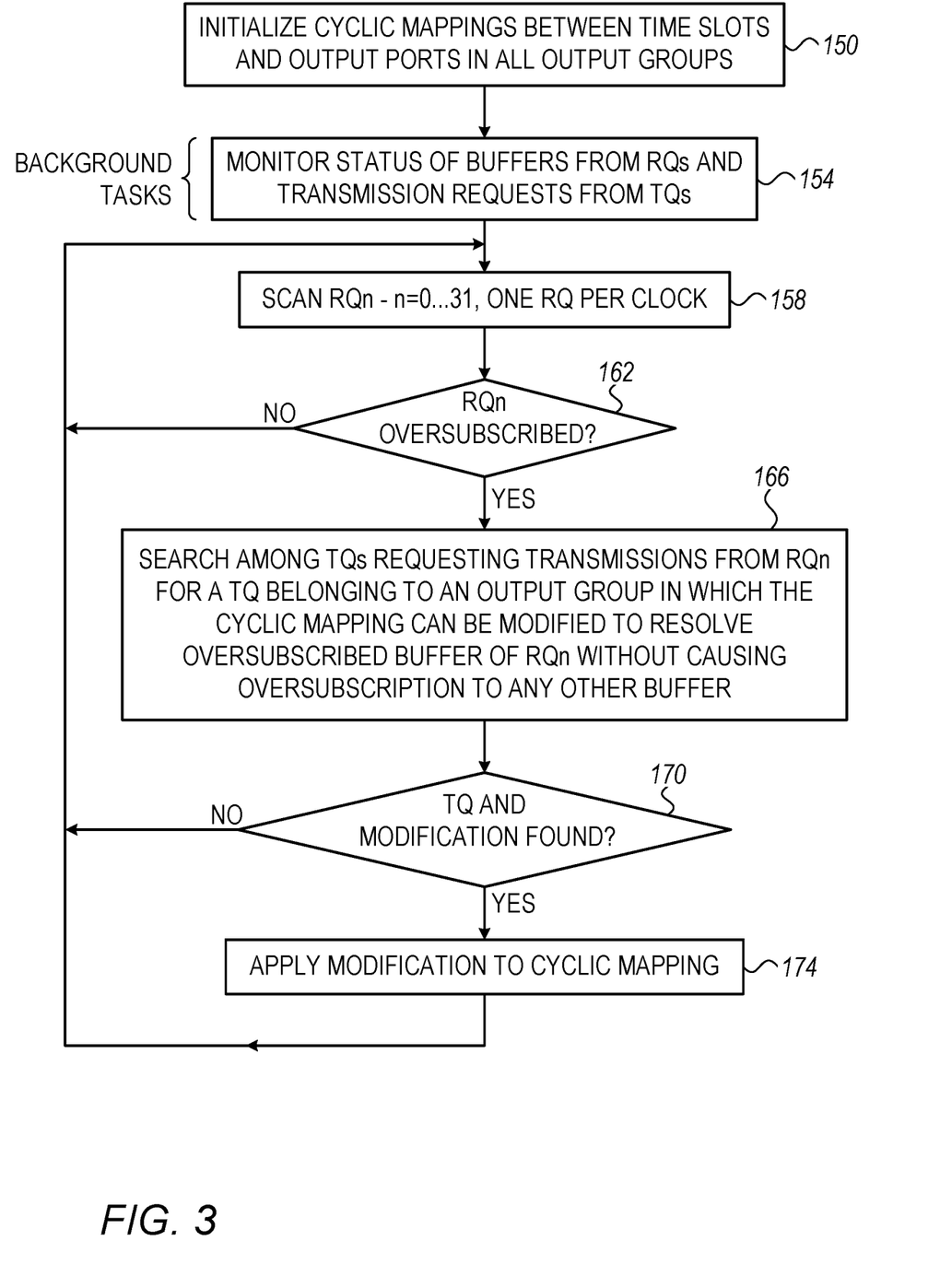
FIG. 3 is a flow chart that schematically illustrates a method for modifying cyclic mappings between time slots and output ports for resolving oversubscribed buffers, in accordance with an embodiment that is described herein.

FIG. 3 is a flow chart that schematically illustrates a method for modifying cyclic mappings between time slots and output ports for resolving oversubscribed buffers, in accordance with an embodiment that is described herein. The method of FIG. 3 will be described as being executed by scheduler 72 of network element 20 of FIG. 1.

The method begins with scheduler 72 initializing cyclic mappings TM0 . . . TM31 (90) of respective output groups OG0 . . . OG31, at a mapping initialization step 150. For example, the scheduler initializes a default mapping that associates time slots T0 . . . T3 with respective output ports POg_0 . . . POg_3, where g=0 . . . 31 denotes the index of the relevant output group. Alternatively, other suitable initial cyclic mappings can be used, e.g., at least two of the output groups may be initialized by the scheduler to different respective cyclic mappings.

In some embodiments, the scheduler has direct access to modifying the cyclic mappings. In other embodiments, the cyclic mappings are controlled by the respective TQs, and the scheduler modifies the cyclic mappings indirectly, e.g., by sending modified cyclic mappings to the respective TQs.

At a monitoring step 154, the scheduler monitors RQs 62 and TQs 66 for evaluating the current usage of RQ resources and TQ resources. Although in the method of FIG. 3, step 154 appears as being executed once, step 154 is typically executed cyclically as a background task in parallel to the main flow that is described below.

In some embodiments, the scheduler monitors RQ resources, TQ resources or both, by receiving messages published by the RQs and TQs. Alternatively, the scheduler polls the RQs, TQs or both for monitoring RQ resources and/or TQ resources.

In some embodiments, the scheduler monitors for each RQ a buffer status indication of the respective readout status of buffer 40. The readout status is indicative of the buffer usage load, e.g., in terms of the number of transmission requests assigned to that buffer, in each of the four time slots of the time-division cycle. In an embodiment, the readout status is indicative of whether the number of TQs requesting the buffer is below the buffer capacity, equals the buffer capacity or exceeding the buffer capacity, for each of the four time slots. In the present example, the buffer capacity specifies three transmission requests per time slot.

In some embodiments, TQ resources monitored by the scheduler are indicative of the RQs (or identities of the buffers) requested by each TQ in each time slot of the time-division cycle. In an embodiment, a TQ may additionally publish to the scheduler time slots in the time-division cycle that are currently unused, which may assist the scheduler in resolving resource conflicts faster.

In some embodiments, the scheduler organizes the monitored RQ resources and TQ resources in a resource matrix having #RQs rows and #TQs columns. In the present example such resource matrix comprises a 128-by-32 matrix. The (i,j) element in the resource matrix may comprise a vector having a number of elements equal to the number of time slots in the time-division cycle. The vector elements have unity or zero values indicating that the $i^{th}$ TQ respectively requires, or does not require, transmissions from the buffer of the $i^{th}$ RQ, in each of the four time slots of the time-division cycle. In this embodiment, the scheduler may sum the matrix elements over a column of the resource matrix to calculate the numbers of TQs requesting transmissions from the buffer of the relevant RQ in each of the four time slots.

In some embodiments, RQs indicate to the scheduler of packets scheduled for transmission only once per packet in a single clock period. In such embodiments, for stable scheduler operation, the packet indication is extended over a number of clock periods that matches the maximal expected packet length.

At a receive queues scanning step 158, the scheduler scans the information monitored for the RQs. The scheduler may scan the RQs sequentially or in any other suitable order. In some embodiments, the scheduler handles one RQ in each clock cycle. The scheduler may scan the RQs, for example, by scanning the columns of the resource matrix described above. At a buffer status checking step 162, the scheduler checks whether the buffer of the currently scanned RQ (denoted RQn) is oversubscribed, and if not, loops back to step 158 to select a subsequent RQ. Otherwise, the scheduler proceeds to a resolving step 166.

At step 166, the scheduler identifies TQs that are requesting transmissions from the buffer of RQn. The scheduler then searches among the identified TQs, for a TQ belonging to an output group in which the cyclic mapping can be modified to resolve the oversubscribed buffer of RQn, without causing oversubscription to any other buffer. As noted above, in some embodiments, a cyclic mapping modification involves swapping time slot assignment of two output ports of the relevant output group.

A cyclic mapping modification that resolves the oversubscribed buffer of RQn is not necessarily unique. In some embodiments, multiple output groups in which a TQ requests transmissions from the buffer of RQn can be modified to resolve the oversubscription state of the RQn buffer. Moreover, for a given output group, multiple different modifications to the cyclic mapping may be suitable for resolving the oversubscription state of the RQn buffer. In some embodiments, the scheduler checks multiple possible output groups and/or modification permutations and selects one output group and one mapping modification for the selected output group.

In an example embodiment, the scheduler selects with high priority, a permutation that assigns transmission to a time slot that is currently unused (without causing oversubscription to other buffers). In another embodiment, the scheduler refrains from selecting permutations that assign transmissions to TQs that are currently blocked due to applying a method that limits the rate of mapping modifications. In yet another embodiment, the scheduler selects with high priority permutations that simultaneously resolve multiple oversubscribed buffers. In some embodiments, the scheduler randomly selects a permutation among valid permutation candidates. In other embodiments, the scheduler scans the TQs in any suitable order, and selects the first output group that applies for resolving the oversubscription state of the RQn buffer.

At a modification availability checking step 170, the scheduler checks whether a TQ and a modification to the cyclic mapping of a respective output group have been found at step 166, and if not, loops back to step 158 to select a subsequent RQ. Otherwise, the scheduler proceeds to a cyclic mapping modification step 174, to modify the cyclic mapping of the output group selected at step 166, using the modification permutation selected at step 166.

In some embodiments, the scheduler modifies a cyclic mapping of a given output group by sending to the TQ related to an oversubscribed buffer a remapping command specifying the modified assignment between time slots and output ports for that output group. The TQ may apply the requested remapping command after a delay of up to several tenths of clock cycles. In an embodiment, The TQ notifies the scheduler that executing the command has completed, after actually executing the cyclic mapping modification specified in the remapping command.

In some embodiments, the scheduler limits the modification rate at step 174, e.g., by performing the modification only once in a predefined period. For example, the scheduler applies a cyclic mapping modification once per a predefined number of clock cycles such as once per several tenths of clock cycles, e.g., 40 clock cycles. Such rate limiting may be useful for avoiding unnecessary modifications to cyclic mappings and for improving the stability of decision making within the scheduler. In some embodiments, by limiting the cyclic mapping modification rate, the scheduler (i) avoids attempting to resolve RQs whose buffers are not oversubscribed, and (ii) typically resolves oversubscribed buffers within two modification steps in a relevant output group. In other embodiments, the scheduler limits the rate of cyclic modification operations indirectly, by limiting the monitoring rate of the RQ and TQ resources. In an example embodiment, the scheduler updates its internal readout status of a given buffer only after monitoring the same readout status value for a predefined number of times within a predefined period.

In some embodiments, at step 174 the scheduler performs a cyclic modification only at packet boundaries. In such embodiments, the scheduler delays the application of the cyclic modification until the packet transmitted via the output port related to the oversubscribed buffer is fully egressed. In other embodiments, the scheduler applies a cyclic modification on demand, even between packet boundaries.

Following step 174 the scheduler loops back to step 158 to select a subsequent RQ.

In some embodiments, the network element monitors transmission load on the TQs. The network element may identify a congested TQ, i.e., a TQ whose emptying rate towards the respective output port is insufficiently fast. For example, the scheduler detects that the TQ fills at a higher rate than its emptying rate for a duration exceeding a predefined period. In some embodiments, in response to receiving an indication of a congested TQ, the scheduler gives this TQ a high priority in the process of selecting an output group and a modification permutation at step 166 above.

In the method of FIG. 3, the scheduler scans the RQs and identifies TQs requesting transmissions from oversubscribed buffers of the scanned RQs. In alternative embodiments, the scheduler scans the TQs, identifies the RQs requested by each scanned TQ and checks whether the buffers of these RQs are oversubscribed in any of the four time slots of the time-division cycle. In some embodiments, the scheduler publishes to the TQs the identities of oversubscribed buffers (RQs) and the corresponding time slots among the four time slots of the time-division cycle. Based on this published information, a TQ detecting it is requesting transmissions from an oversubscribed buffer at a given time slot, notifies to the scheduler the identity of the oversubscribed buffer and time slot, accordingly. In an embodiment, the scheduler sequentially scans the TQs from which the scheduler received a notification, and grants one of these TQs to modify the relevant cyclic mapping in a clock cycle. A granted TQ applies a cyclic mapping modification only when the TQ can swap between the output port related to the oversubscribed buffer and time slot, and an output port related to a buffer that has less than three transmission requests at the target time slot.

A given scanned TQ, whose output port is mapped to a given time slot, may possibly belong to an output group in which all alternative time slots are used by buffers already having three transmission requests in the same given time slot as the given TQ. In such cases the scheduler skips cyclic modification in this output group, which modification is ineffective. Note, however, that for an "All2ALL" traffic model (which will be described below), when the number of output groups in the network element is less than forty, the buffer oversubscription state is guaranteed to be resolved by modifying the cyclic mapping in an output group of another TQ requesting this buffer. The limitation of forty transmission requests is related to a configuration of four transmissions from each TQ to four RQs in each time slot.

To explain the limitation of forty requests above, note that the modification of the cyclic mapping for a given TQ fails, if among the four RQs requested by this given TQ, one RQ is oversubscribed, i.e., the buffer of this RQ has four transmission requests on a given time slot, and each of the other three RQs has three transmission requests on the same given time slot. The oversubscribed RQ cannot be resolved when all the four TQs to which it transmits fail as described above. Such a situation may occur only when there are 40 simultaneous transmission requests in the network element, in the given time slot, as described herein. The oversubscribed RQ has four transmission requests in the given time slot. Additional $3\times3=9$ transmission requests, in the given time slot, corresponding to all four TQs requesting transmissions from the oversubscribed RQ will block possible resolving of the oversubscribed RQ. The number of transmission requests that would prevent resolving the oversubscribed RQ is therefore given by $4+4\cdot9=40$. Note that the maximal number of transmission requests in each time slot cannot exceed the number of output groups. In the present example, the number of output groups is 32<40 and therefore resolving an oversubscribed buffer is guaranteed by some TQ, for All2All traffic model.

As noted above, modifying a cyclic mapping of a given output group may be done by swapping between the time slots assigned to two output ports in the same output group. Let POi and Ti denote the output and time slot associated with an oversubscribed buffer, and let POj and Tj denote an output port and time slot candidate for swapping in the same output group. In some embodiments, the scheduler scans over Tj, j=0 . . . 3, j≠i, and selects the first valid candidate Tj that is unused, or for which the buffer transmitting to POj at Tj is requested by less than three TQs. When such Tj cannot be found, the scheduler proceeds to scan other TQs or RQs related to oversubscribed buffers.

Example Simulation Results

The inventors have conducted computer simulations to evaluate the throughput improvement in various traffic scenarios. For example, in a traffic model denoted "All2All," every input port receives packets that are destined to only one output port, and each output port transmits packets received via a single input port. Computer simulations of the embodiments described above indicate that the probability of oversubscribing one or more buffers with this traffic model is about 33%. More specifically, 67% of the traffic causes no buffer oversubscription, and within the oversubscribed 33%-93% of the traffic cause oversubscription in exactly one buffer, and 99.2% of the traffic cause at most two buffers to become oversubscribed simultaneously. When applying the embodiments described above (e.g., with reference to FIG. 3) in most cases (93%) one pass of scanning all the RQs is sufficient to resolve all oversubscribed buffers.

As another example, a traffic model was tested, in which every two RQs (buffers 40) are transmitting randomly to eight different output ports (having associated TQs) belonging to eight different output groups. The eight TQs have the same output port index among the four output ports of the output group and the same time slot assignment within the four time slots of the time-division cycle.

The following random traffic models were tested: Model1—The traffic transmitted by the two buffers is distributed randomly among the eight output ports, without transmitting to any other output ports. Model2—The traffic transmitted by the two buffers is distributed randomly among the eight output ports 50% of the time, and among other output ports 50% of the time. Model3—The traffic transmitted by the two buffers is distributed randomly among the eight output ports 80% of the time, and among other output ports 20% of the time.

In each of the traffic models Model1, Model2 and Model3 above, the output wire speed (across all output ports) is only 70%, 92% and 80%, respectively, of the maximal wire speed, due to buffers becoming oversubscribed. When the scheduler is configured to apply the embodiments described above (e.g., the method of FIG. 3) the wire speed converges to about 97% of the maximal wire speed. Moreover, in Model1, after the scheduler performs about 20 cyclic modification operations, the wire speed exceeds 92% of the maximal wire speed, even when performing cyclic modification once per 40 clock cycles.

The embodiments described above are given by way of example, and other suitable embodiments can also be used. For example, in the embodiments described above each of the buffers comprises three interfaces for simultaneous readings. In alternative embodiments, a number of multiple interfaces other than three can also be used. Further alternatively, different buffers may comprise different respective numbers of read interfaces.

As another example, consider a switch operating in a "Virtual Output Queueing" mode, in which each RQ (buffer) may receive multiple transmission requests from multiple TQs (output ports) simultaneously, in each time slot. The switch is required to match in each time slot between TQ requests an RQs transmitting to these TQs. In some embodiments, the switch starts with applying a greedy matching scheme. Over time, e.g., depending on traffic pattern, the switch selects to apply more sophisticated matching techniques, such as modifying cyclic mappings as described in the embodiments above, for increasing the throughput.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
multiple output ports coupled to a communication network and organized in M groups, each group comprising P output ports that are selectable over respective predefined time slots in accordance with a cyclic mapping between the time slots and the output ports for that group;
a crossbar fabric comprising M fabric outputs coupled respectively to the groups, and N fabric inputs coupled respectively to N buffers that store packets for transmission via the output ports, wherein in each time slot, the crossbar fabric is configured to receive data from the buffers via the fabric inputs, and route the data to the fabric outputs in accordance with a routing plan; and
a scheduler, configured to:
determine the routing plan over the time slots, and apply the routing plan for transmitting the packets from the buffers to the communication network via the crossbar fabric and the output ports;
in response to identifying that, in a given time slot, a required rate of readout of the packets from a given buffer exceeds a maximum rate supported by the given buffer, select a group of the output ports to which the given buffer is routed by the crossbar fabric in the given time slot, and modify the cyclic mapping for the selected group to produce a modified cyclic mapping that reduces the required rate of readout from the given buffer in the given time slot.

2. The network element according to claim 1, wherein the given buffer comprises a number F of interfaces for simultaneously reading data of F different packets that are pending for transmission in the given buffer, and wherein the scheduler is configured to identify that the given buffer is oversubscribed by identifying that a number of simultaneous transmissions requested from the given buffer exceeds the number F.

3. The network element according to claim 2, wherein the scheduler is configured to identify that the given buffer is oversubscribed by monitoring readout status of at least some of the N buffers, including the given buffer, wherein the readout status of a buffer is indicative of a number of transmission requests assigned to that buffer.

4. The network element according to claim 2, wherein the scheduler is configured to identify that the given buffer is oversubscribed, by monitoring multiple transmission queues associated respectively with the multiple output ports, including a transmission queue of an output port to which the given buffer is routed, and checking whether a buffer routed to an output port of a monitored queue is oversubscribed.

5. The network element according to claim 2, wherein the scheduler is configured to produce the modified cyclic mapping by applying a permutation among the time slots and the output ports of the cyclic mapping so that no other buffer that is routed to an output port of the selected group becomes oversubscribed by using the modified cyclic mapping.

6. The network element according to claim 1, wherein the scheduler is configured to determine a permutation to be applied to the cyclic mapping for producing the modified cyclic mapping, and to apply the determined permutation to the cyclic mapping only after a delay that does not exceed a maximal predefined delay.

7. The network element according to claim 1, wherein the scheduler is configured to modify the cyclic mapping by swapping a time slot assigned in the cyclic mapping to an output port to which the given buffer is routed, with a different time slot assigned in the cyclic mapping to another output port in the selected group.

8. The network element according to claim 7, wherein the different time slot is assigned for transmission by another buffer, and wherein the scheduler is configured to verify that a required rate of readout from the another buffer is less than a maximum rate supported by the another buffer.

9. The network element according to claim 1, wherein the scheduler is configured to apply the routing plan by coordinating, for each time slot, between (i) reading from a buffer using a specified read interface, (ii) applying a specified routing scheme within the crossbar fabric, and (iii) outputting the read data to a specified output port.

10. The network element according to claim 1, wherein in response to identifying that a transmission queue associated with a given output port is congested, the scheduler is configured to give the group of output ports to which the given output port belongs, high priority to be selected for cyclic mapping modification.

11. A method, comprising:
- in a network element comprising multiple output ports coupled to a communication network and organized in M groups, each group comprising P output ports that are selectable over respective predefined time slots in accordance with a cyclic mapping between the time slots and the output ports for that group,
- and a crossbar fabric comprising M fabric outputs coupled respectively to the groups, and N fabric inputs coupled respectively to N buffers that store packets for transmission via the output ports, wherein in each time slot,
- receiving by the crossbar fabric data from the buffers via the fabric inputs, and routing the data to the fabric outputs in accordance with a routing plan;
- determining the routing plan over the time slots, and applying the routing plan for transmitting the packets from the buffers to the communication network via the crossbar fabric and the output ports; and
- in response to identifying that, in a given time slot, a required rate of readout of the packets from a given buffer exceeds a maximum rate supported by the given buffer, select a group of the output ports to which the given buffer is routed by the crossbar fabric in the given time slot, and modifying the cyclic mapping for the selected group to produce a modified cyclic mapping that reduces the required rate of readout from the given buffer in the given time slot.

12. The method according to claim 11, wherein the given buffer comprises a number F of interfaces for simultaneously reading data of F different packets that are pending for transmission in the given buffer, and comprising identifying that the given buffer is oversubscribed by identifying that a number of simultaneous transmissions requested from the given buffer exceeds the number F.

13. The method according to claim 12, wherein identifying that the given buffer is oversubscribed comprises monitoring readout status of at least some of the N buffers, including the given buffer, wherein the readout status of a buffer is indicative of a number of transmission requests assigned to that buffer.

14. The method according to claim 12, wherein identifying that the given buffer is oversubscribed comprises monitoring multiple transmission queues associated respectively with the multiple output ports, including a transmission queue of an output port to which the given buffer is routed, and checking whether a buffer routed to an output port of a monitored queue is oversubscribed.

15. The method according to claim 12, wherein modifying the cyclic mapping comprises producing the modified cyclic mapping by applying a permutation among the time slots and the output ports of the cyclic mapping so that no other buffer that is routed to an output port of the selected group becomes oversubscribed by using the modified cyclic mapping.

16. The method according to claim 11, wherein modifying the cyclic mapping comprises determining a permutation to be applied to the cyclic mapping for producing the modified cyclic mapping, and applying the determined permutation to the cyclic mapping only after a delay that does not exceed a maximal predefined delay.

17. The method according to claim 11, wherein modifying the cyclic mapping comprises swapping a time slot assigned in the cyclic mapping to an output port to which the given buffer is routed, with a different time slot assigned in the cyclic mapping to another output port in the selected group.

18. The method according to claim 17, wherein the different time slot is assigned for transmission by another buffer, and comprising verifying that a required rate of readout from the another buffer is less than a maximum rate supported by the another buffer.

19. The method according to claim 11, wherein applying the routing plan comprises coordinating, for each time slot, between (i) reading from a buffer using a specified read interface, (ii) applying a specified routing scheme within the crossbar fabric, and (iii) outputting the read data to a specified output port.

20. The method according to claim 11, and comprising, in response to identifying that a transmission queue associated with a given output port is congested, giving the group of output ports to which the given output port belongs, high priority to be selected for cyclic mapping modification.

* * * * *